May 23, 1950     A. L. M. A. ROUY     2,508,424
MEASURING OF VOLTAGE BY VOLTAGE OPPOSITION
Filed June 30, 1945
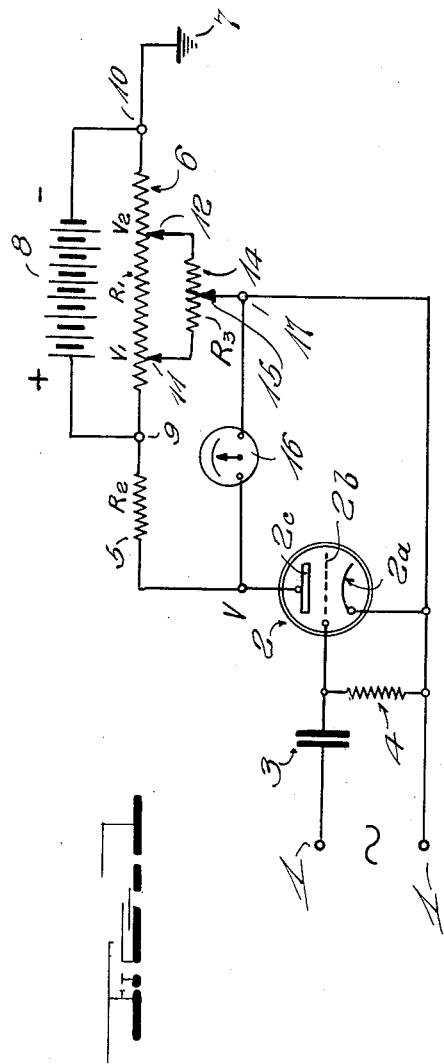
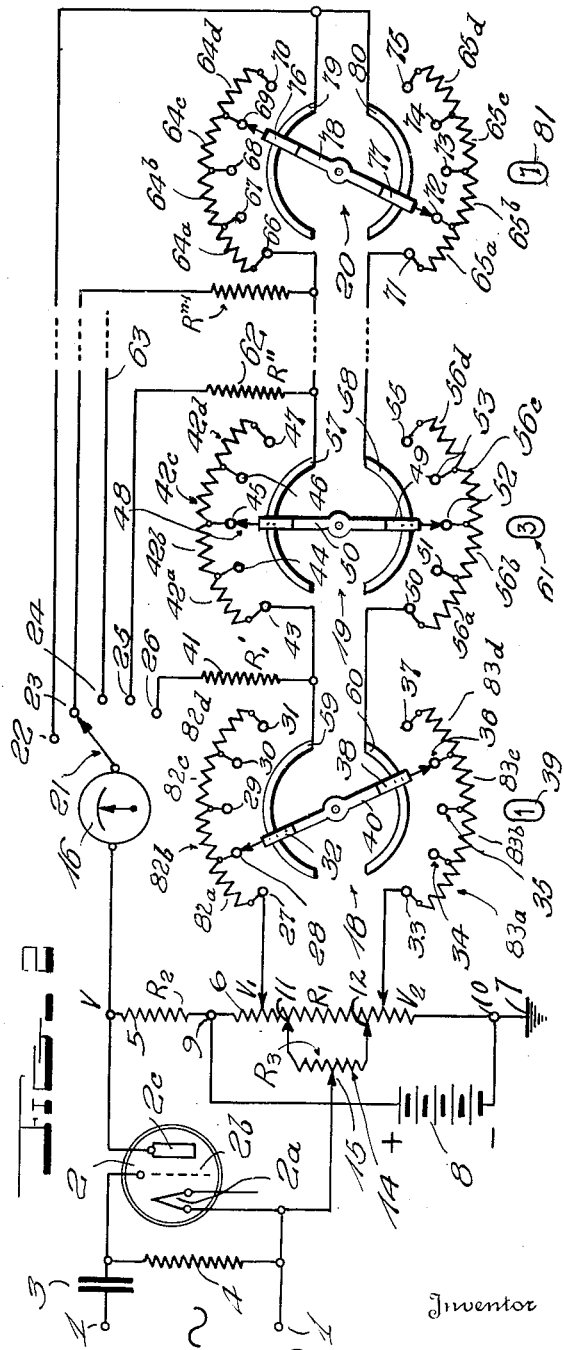
Inventor
Auguste Louis Marie Antoine Rouy,
By John B. Brady
Attorney Patented May 23, 1950

2,508,424

UNITED STATES PATENT OFFICE 2,508,424

MEASURING OF VOLTAGE BY VOLTAGE OPPOSITION

Auguste Louis Marie Antoine Rouy, New York, N. Y., assignor to L. L. H. Company, Erie, Pa., a partnership Application June 30, 1945, Serial No. 602,488

5 Claims. (Cl. 171—95)

My invention relates broadly to electrical measuring methods and apparatus and more particularly to a method and apparatus for precision measurement of voltages.

One of the objects of my invention is to provide a circuit arrangement for the precision measurement of voltages by voltage opposition.

Another object of my invention is to provide an improved circuit arrangement for a vacuum tube voltmeter having a high degree of sensitivity.

Still another object of my invention is to provide a method of measuring voltages which consists in matching known voltages against the voltages to be determined for effecting the balanced operation of a meter which when precisely balanced permits the applied voltage to be read in terms of the known voltage which is supplied to the circuit.

A further object of my invention is to provide an electronic measuring circuit for facilitating the matching of the unknown applied voltages against known supplied voltages for accurately determining the value of the applied voltage.

Other and further objects of my invention reside in the method and apparatus for accurately measuring voltages by voltage opposition as set forth more fully in the specification hereinafter following by reference to the accompanying drawings in which:

Figure 1 is a diagrammatic view illustrating the theory involved in the measuring apparatus of my invention; and Fig. 2 is a schematic circuit arrangement of a voltage measuring circuit embodying my invention.

Referring to the drawings in detail reference character 1 designates terminals to which an alternating current voltage is applied for application to the input circuit of an electron tube represented by the triode 2 having cathode 2a, control grid 2b and anode or plate 2c. The input circuit to the triode 2 is completed from terminals 1 through condenser 3 and shunting resistor 4. The output circuit of the triode 2 extends from anode 2c through resistance 5 and resistance 6 to ground 7. Resistance 6 has the source of potential 8 connected across the opposite terminals 9 and 10 thereof. The resistance 6 also has a pair of adjustable contactors 11 and 12 establishing slidable connection with the resistance 6 at the points $V_1$ and $V_2$. The adjustable contactors 11 and 12 have resistance 14 connected therebetween. The output circuit of triode 2 is completed by an adjustable contactor 15 operating on resistance 14. A galvanometer 16 is connected between the point V in the output circuit immediately adjacent the anode 2c and the point 17 in the output circuit which returns to the cathode 2a. For purposes of the explanation of my invention hereinafter following, I have designated the value of resistance 5 as $R_2$; resistance 6 as $R_1$ and resistance 14 as $R_3$.

In Fig. 2 I have shown one of the practical embodiments of my invention in which the potential nodes represented at $V_1$ and $V_2$ are electrically connected to a resistance network comprising separate coacting resistance boxes designated at 18, 19, 20, etc., forming resistance paths which may be selected for effective connection in the output circuit of electron tube 2 by means of selector switch 21 electrically connected in circuit with galvanometer 16 and operating over a multiplicity of fixed contacts shown at 22, 23, 24, 25 and 26.

Each resistance box includes a multiplicity of separate resistance elements connected to contacts over which adjustable switch elements operate. Resistance box 18 includes a successive arrangement of resistance elements represented at 18a, 18b, 18c and 18d, each of a value of, for example, 10,000 ohms connected to contacts 27, 28, 29, 30 and 31 over which switch arm 32 is arranged to move for establishing successive selective contact therewith.

Resistance box 18 also includes a set of resistors 18a', 18b', 18c' and 18d', each having a resistance of 10,000 ohms. This latter group of resistance elements connects to a series of contacts shown at 33, 34, 35, 36 and 37. Switch arm 38 establishes successive selective connection with the contacts 33, 34, 35, 36 and 37 simultaneously with the movement of switch arm 32 over the contacts 27, 28, 29, 30 and 31. An appropriate gear and observing window arrangement 39 is provided for indicating the position of the two switch arms 32 and 38 with respect to the sets of contacts. Switch arms 32 and 38 are simultaneously mechanically actuated in opposite angular directions through suitable connecting means as represented at 40 for completing electrical circuits through the selected resistance elements between the potential points $V_1$ and $V_2$ and also between potential point V and galvanometer 16 through switch arm 21, contact 26 and resistor 41 designated as having the value $R_1'$.

The second resistance box 19 is similar to the resistance box 18 except that the individual resistance elements each have an effective value of 1,000 ohms instead of 10,000 ohms.

I have shown the resistance elements at 42a, 42b, 42c and 42d connected to contracts 43, 44, 45, 46 and 47 over which a contactor 48 selectively and successively establishes electrical connection. A corresponding and opposite contactor 49 is actuated by the same switch arm 50 which carries contactor 48 and establishes selective electrical connection successively with contacts 50, 51, 52, 53 and 55 connected to sections 56a, 56b, 56c, and 56d constituting resistance elements electrically connected in series and arranged to be effectively connected in the measuring circuit. The variable contactors 48 and 49 are variably movable over the arcuate shaped contactors 57 and 58 which establish electrical connection with the contactors throughout the range of their adjustment. The arrangement is similar to the arrangement of the switch arms 32 and 38 which slide over the arcuate shaped contactors 59 and 60. The resistors 42a, 42b, 42c, 42d, and 56a, 56b, 56c and 56d each have a value of 1,000 ohms. The change of effective resistance of the resistance box 19 is registered through an appropriate gear and observing mechanism schematically represented at 61.

Connection is established from fixed contact 26 with resistance box 18 through resistor 41 as shown. Connection is established with resistance box 19 through contact 25 and resistor 62 as shown. A number of additional resistance boxes may be provided in the circuit which I have represented as connected to fixed contact 24 leading to a circuit which is indicated as extending with some indefiniteness at 63 to represent connection to any number of resistance boxes having different increments of value for the individual resistors. I have represented resistance box 20 as containing resistance elements which are of one ohm each in value at 64a, 64b, 64c and 64d; and 65a, 65b, 65c and 65d connected to contacts 66, 67, 68, 69, 70, 71, 72, 73, 74 and 75 as shown. Contactors 76 and 77 establish successive and selective connection with the sets of contacts 66-75, inclusive, as the arm 78 is revolved. The arcuate shaped slip connection members 79 and 80 serve to establish variable and adjustable connection with contactors 76 and 77 as arm 78 is selectively moved. The effective value of resistance included by box 20 may be read through an appropriate observing window arrangement represented at 81.

The switching units 18, 19, 20 and 21 determine the effective value of the calibrated resistances which are included in the shunt path between the variable taps $V_1$ and $V_2$ on resistance 6. By moving switch arm 21 to contact 26 only the switching unit 18 is connected between meter 16 and taps $V_1$ and $V_2$. By shifting switch 21 to contact 25 both switching units 18 and 19 are included between meter 16 and variable taps $V_1$ and $V_2$. By changing switch 21 to contacts 24 or 23 additional switching units, not shown, are included between meter 16 and variable taps $V_1$ and $V_2$. By shifting switch 21 to contact 22 all of the switching units shown at 18, 19 and 20 are included between meter 16 and variable taps $V_1$ and $V_2$.

The known voltage from source 8 is applied across the terminals of resistance $R_1$ disposed in the plate circuit of vacuum tube 2. The voltage to be measured is the plate voltage V at plate electrode 2c developed by impressing an unknown voltage across terminals 1. The resistor 6 having the value $R_1$ is arranged in series with resistor 5 having value $R_2$ through which the plate current passes which produces a voltage drop across resistor 6 which is the unknown voltage. The meter 16 is arranged in the plate circuit of tube 2 and in series with the adjustable calibrated resistance system as illustrated at 18, 19 and 20 through selector switch 21. The calibrated resistance system includes a pair of series paths through graduated resistances calibrated in terms of voltage. The circuit is completed from cathode 2a of tube 2 with the moving contact 15 on resistor $R_3$ which is connected through adjustable taps 11 and 12 with resistor 6 having the value $R_1$. Meter 16 will register current flow so long as there is a difference between the known voltage 8 and the unknown voltage developed across $R_1$. Moving contact 15 on resistor $R_3$ is first adjusted to reduce the reading on meter 16 to a minimum. Selector switch 21 is moved to contact 22 and calibrated resistance switching units 18, 19 and 20 adjusted on their several contacts to further reduce the deflection of meter 16. This process is repeated by moving selector switch 21 successively to contacts 23, 24, 25 and 26 to provide that effective resistance which with current flow in the plate circuit will develop voltage opposing the known voltage 8 to provide minimum deflection or a null point on meter 16. For every measurement the operator has to turn the knob of the switching units until the galvanometer indication at 16 is the smallest, then adjust the adpacent switch unit, and so on. The windows 39, 61 and 81 with number displayed on calibrations visible therethrough provides a direct reading of the voltage values.

Assume that the voltage that is to be measured is V on the plate 2c of a vacuum tube 2 and this voltage does vary between the values $V_1$ and $V_2$. This voltage being developed through the plate current across the plate resistance $R_2$ and across resistance $R_1$. In order to make an accurate measurement of voltage V the resistor 14 is connected between the points $V_1$ and $V_2$ of known values on the dividing resistor 6 of the voltage supply.

Then as long as the total value of resistor 6 is known by adjusting moving contact 15 I am able to find and locate a point on resistor 6 at which the voltage is exactly the same as that of the unknown voltage V. When these two voltages are equal no current will flow through the galvanometer 16 and the voltage may be read from predetermined calibrations of the resistances in the calibrated resistance paths. For example, assuming the total value of resistor 14 to be 100,000 ohms and the current flowing through it being $1 \times 10^{-3}$ amp. Then the voltage difference $V_1 - V_2$ will equal 100 volts. If a resistance variation of only 1 ohm is allowed, then the voltage value will be $1 \times 10^{-3}$ volts and the value can be read with five exact figures such as, for example, 52.931 volts. In the case where this 100 volts variation is due to a displacement of one milliampere on a photoelectric gauge then variations as small as $1/100,000$ can be detected and the apparatus of my invention permits a reading, for example, of values such as .78343 milliammeter in which the figure will be exact within the accuracy of each of the elementary resistances, for instance within 1%.

A very important advantage of this method of measurement resides in the fact that for any range of the decimal, the definition of its value resides within the accuracy of the resistor, as for example 1% of the decimal range. In other words, if we measure the variation of the decimal value, of any range of the decimal scale, these measurements will always be within 1%.

For example, suppose that the measurement of a value of .78343 is performed and then the variations of the decimals of the .00001 order observed. Measurements equal to .78347 and .78343 are made having a difference .00004 which is known to be within 1%.

While I have described my invention in one of its preferred embodiments, I realize that modifications may be made and I desire that it be understood that no limitations upon my invention are intended other than may be imposed by the appended claims.

What I claim and desire to secure by Letters Patent of the United States is as follows:

1. In a system of measuring voltage by voltage opposition, an electron tube including a cathode, a grid, and a plate electrode, an input circuit connected between said cathode and grid electrode, an output circuit connected between said cathode and plate electrode, and including a resistance connected at one end with said plate electrode, a pair of spaced variable taps on said resistance, a separate resistance connected between said taps, an adjustable contactor on said separate resistance connected with said cathode, a calibrated resistance, a measuring instrument, a series circuit including said measuring instrument and said calibrated resistance connected between said plate and a variable connection along said first mentioned resistance, means for impressing a predetermined voltage across said first mentioned resistance for equalizing the voltage existing across said input circuit whereby said two voltages may be balanced in opposition to a condition in which the effect upon said meter is null for determining the value of said unknown voltage from readings of the calibrations of said calibrated resistance.

2. An apparatus for measuring voltage by voltage opposition, comprising in combination an electron tube including a cathode, a grid and a plate electrode, an input circuit connected between said cathode and grid electrode and across which an unknown voltage is impressed, an output circuit including a resistance path connected at one end with said plate and having a multiplicity of variable taps thereon, an auxiliary resistance connected between two of said variable taps, a movable contactor on said auxiliary resistance connected with said cathode, a pair of calibrated resistances graduated in terms of voltage, a meter connected between said plate and said pair of calibrated resistances, and means for impressing a predetermined voltage across a portion of said calibrated resistances whereby a substantially zero reading may be produced on said meter upon adjustment of the effective values of said calibrated resistances to equalize the voltage delivered to said meter through said calibrated resistances with the value of the voltage impressed across said input circuit for determining the value of the voltage across said input circuit from the graduations read on said calibrated resistances.

3. In an apparatus for measuring voltage by voltage opposition, an electron tube system including a cathode, a grid and a plate, an input circuit connected across said cathode and grid, an output circuit connected between said plate and cathode, a resistance included in said output circuit, means for impressing an alternating current across said input circuit, a pair of calibrated resistances connected with variable taps on said resistances in said output circuit, a source of predetermined direct current voltage connected across portions of said calibrated resistances and a meter connected between a point adjacent said plate and in series with said calibrated resistances to the variable taps on said first mentioned resistance for controlling the effective voltage thereacross in opposition to the direct current voltage across said output circuit and with respect to the effect of the alternating current voltage impressed upon said input circuit for securing a substantially neutral reading of said meter for determining from the calibrations on said resistance the value of said impressed voltage.

4. In a system for measuring voltage by voltage opposition an electron tube including cathode, grid and plate electrodes, an input circuit connected with said cathode and grid electrodes, an output circuit connected between said cathode and plate electrodes, means for impressing an unknown alternating current voltage across said input circuit, a resistance connected in said output circuit, a resistance network including a multiplicity of variable step calibrated sections, means for electrically connecting selected sections of said resistance network with said resistance, a meter connected between said plate and selected calibrated section of said resistance network and a source of direct current voltage connected across a portion of said resistance whereby the effect of said source in said output circuit may be opposed with respect to the effect of the alternating current impressed upon said input circuit for producing a null reading of said meter when the value of the voltage impressed upon said input circuit equals the value of the effective voltage in said output circuit for determining said unknown voltage from calibrations of the sections of said resistance network.

5. An apparatus for measuring voltage by voltage opposition comprising an electron tube including at least a cathode, control grid and anode, an input circuit connected between said control grid and cathode for application of an unknown source of voltage thereto, an output circuit including said cathode and anode, a known potential source in said output circuit, a system of calibrated resistances connected in said output circuit including a resistance path shunt connected with said output circuit and a multiplicity of parallel connected sectionalized calibrated resistors selectively connectable in shunt with a portion of the aforementioned resistance path, a galvanometer connected with said output circuit, a selector switch connected with said galvanometer and operative over a series of step-by-step contacts, connections from said contacts to said sectionalized calibrated resistors for selectively including portions of said output circuit and a potentiometer having its opposite terminals adjustably connected through movable taps with said resistance path and an adjustable connection extending from said potentiometer to the cathode of said electron tube whereby the effect of voltage opposition between said unknown and known voltage sources can be measured by said galvanometer by observation of the null point.

AUGUSTE LOUIS MARIE ANTOINE ROUY.

REFERENCES CITED

The following references are of record in the file of this patent:

UNITED STATES PATENTS

| Number | Name | Date |
|---|---|---|
| 1,791,563 | Horn | Feb. 10, 1931 |
| 2,143,219 | Wenger | Jan. 10, 1939 |
| 2,208,329 | Morelock | July 16, 1940 |

FOREIGN PATENTS

| Number | Country | Date |
|---|---|---|
| 669,086 | Germany | Dec. 16, 1938 |

OTHER REFERENCES

"Instruments," vol. 18, pp. 462–465, July 1945.